(12) United States Patent
Leonard et al.

(10) Patent No.: US 7,219,576 B2
(45) Date of Patent: May 22, 2007

(54) VARIABLE RATIO PEDAL ASSEMBLY

(75) Inventors: Jube R. Leonard, Barrie (CA);
Michael R. Sykes, Orangeville (CA);
Dominic D. Porco, Toronto (CA)

(73) Assignee: Ventra Group Inc., Ontario (CA)

( * ) Notice: Subject to any disclaimer, the term of this patent is extended or adjusted under 35 U.S.C. 154(b) by 0 days.

(21) Appl. No.: 10/995,098

(22) Filed: Nov. 24, 2004

(65) Prior Publication Data

US 2005/0109572 A1 May 26, 2005

Related U.S. Application Data

(60) Provisional application No. 60/524,908, filed on Nov. 26, 2003.

(51) Int. Cl.
*G05G 1/04* (2006.01)
(52) U.S. Cl. .......................................... 74/518; 74/512
(58) Field of Classification Search .................. 74/512, 74/518, 516, 517
See application file for complete search history.

(56) References Cited

U.S. PATENT DOCUMENTS

| | | | |
|---|---|---|---|
| 3,646,831 A | | 3/1972 | Janosi |
| 3,678,779 A | * | 7/1972 | Janosi ........................ 74/516 |
| 3,858,457 A | | 1/1975 | Mathues |
| 3,911,760 A | | 10/1975 | Elbers et al. |
| 3,988,945 A | | 11/1976 | Fasano |
| 4,069,722 A | | 1/1978 | Derrick |
| 4,386,537 A | | 6/1983 | Lewis |
| 4,615,235 A | | 10/1986 | Horvath |
| 4,875,385 A | * | 10/1989 | Sitrin .......................... 74/512 |
| 5,010,782 A | * | 4/1991 | Asano et al. ................. 74/512 |
| 5,890,399 A | | 4/1999 | Rixon et al. |
| 6,571,660 B2 | * | 6/2003 | Gmurowski et al. .......... 74/512 |
| 6,782,776 B2 | * | 8/2004 | Oberheide et al. ............ 74/512 |
| 6,952,980 B2 | * | 10/2005 | Hayashihara et al. ......... 74/512 |
| 7,051,613 B2 | * | 5/2006 | Burton et al. ................. 74/512 |

(Continued)

FOREIGN PATENT DOCUMENTS

| EP | 1 552 995 A3 | 7/2005 |
|---|---|---|
| WO | WO02/55353 A2 | 7/2002 |

OTHER PUBLICATIONS

European Search Report for application No. 04 257 339.4, dated Jul. 11, 2006, 9 pages.

*Primary Examiner*—Devon Kramer
(74) *Attorney, Agent, or Firm*—Pillsbury Winthrop Shaw Pittman LLP

(57) ABSTRACT

The present invention provides a variable ratio brake pedal actuating assembly with an early increase of geometric ratio or force ratio and a subsequent decrease. The actuating assembly comprises a mount, an arm, an input portion and an input connector. The input connector is operatively connected to the arm such that the ratio varies as the arm moves. The ratio reaches a maximum peak prior to moving 30% of the fully stroked position. Also provided is an actuating assembly that uses a cam guide structure with a contoured cam surface and a link member. A configuration of the contoured cam surface, a guide slot, and the link member are such that the ratio varies as the arm is moved. Yet another aspect of the present invention is to provide a cam guided booster pin linkage assembly that provides a variable pedal ratio.

31 Claims, 13 Drawing Sheets

U.S. PATENT DOCUMENTS

| | | |
|---|---|---|
| 2001/0047695 A1* | 12/2001 | Ichiba .......................... 74/512 |
| 2002/0002874 A1* | 1/2002 | Burton et al. ................. 74/512 |
| 2002/0078784 A1* | 6/2002 | Hayashihara ................ 74/512 |
| 2003/0106392 A1 | 6/2003 | Willemsen |
| 2003/0126941 A1* | 7/2003 | Sauvonnet et al. ........... 74/512 |
| 2004/0226399 A1* | 11/2004 | Hayashihara ................ 74/512 |
| 2006/0053948 A1* | 3/2006 | Mahendra et al. ............ 74/512 |

* cited by examiner

VARIABLE RATIO PEDAL ASSEMBLY

The present application claims priority to U.S. Provisional Application Ser. No. 60/524,908, filed Nov. 26, 2003, the entirety of which is hereby incorporated into the present application by reference.

BACKGROUND OF THE INVENTION

1. Field of the Invention

The present invention relates to variable ratio actuating assemblies for vehicles, such as brake pedal assemblies having a variable pedal ratio. Also, the present invention may relate to other types of levers wherein variable ratio is used.

2. Description of Related Art

Actuating assemblies for operating input elements of vehicles are well-known and include assemblies such as brake pedal assemblies and hand lever assemblies. For example, known brake pedal assemblies include a pedal arm having one end that is pivotally mounted to a mounting structure (e.g., a bracket) provided in the vehicle to enable pivotal movement of the pedal arm about an operating pivot axis. The pedal arm includes an input connector in the form of a booster pin. This booster pin operatively connects to a master cylinder or brake booster push rod that is configured to actuate the master cylinder of the vehicle brake system for purposes of selectively engaging or disengaging the vehicle's brakes. The booster pin is positioned between the operating pivot axis of the pedal arm and a pedal foot pad at an end of the pedal arm opposite the end of the operating pivot axis.

The feel and effectiveness of the braking action experienced by the operator can be varied by changing the geometric pedal ratio, which refers to the geometric relationship between the levers and pivot points that make up the brake pedal assembly. This geometric ratio is related to the pedal's force ratio $F_B/F_A$, where $F_A$ is the amount of force applied to the input portion (e.g., the pedal pad) and $F_B$ is the amount of force applied to the input element (e.g., the brake booster rod). The above-noted brake pedal assembly has a fixed or static relationship between levers. That is, the master cylinder push rod attachment point, i.e., the booster pin, and the operating pivot axis of the pedal arm do not move relative to one another during pedal travel. The geometric pedal ratio for a fixed relationship between levers is typically expressed as R=a/b, where a is the distance between the operating pivot axis and the actuation point on the pedal foot pad, and b is the distance between the operating pivot axis and the master cylinder push rod attachment point, i.e., the booster pin. The force ratio does not exactly follow the ratio a/b, as the angle between the pedal arm and the booster pin varies during pedal travel. However, the force ratio does follow the geometric ratio somewhat closely for most applications.

In general, for a given pedal arm travel at a given input force, pedal assemblies with higher geometric pedal ratios generate greater forces that are applied to the brake system. However, the higher pedal ratio results in a shorter travel of the master cylinder push rod. Additionally, the higher pedal ratio effects the "pedal feel" in the braking action to the user.

With the new lines of larger and heavier trucks and SUVs on the market, and the desire to utilize common components throughout the full range of vehicles (such as the pedal assemblies and the brake boosters), it is desirable to have a higher pedal ratio so that adequate force is applied to the brake system in the event of booster assist failure, i.e., power brake assist is no longer functional. Specifically, the Federal Motor Vehicle Safety Standard and Regulations (FMVSS) dictates that when there is a booster assist failure, the vehicle must be stoppable within a certain distance within a specific pedal load.

However, as noted above, increasing the pedal ratio to accommodate the FMVSS requirements can hurt "pedal feel," which is the operator's perception of comfort or reasonable operation. Moreover, increasing the pedal ratio will mean less travel of the master cylinder push rod for a given amount of pedal movement. The shorter travel of the master cylinder push rod may result in the push rod not being fully stroked to "bottom out" the master cylinder.

Variable ratio brake pedal assemblies are known in the art. For example, see U.S. Patent Application Publication No. US 2003/0106392 and U.S. Pat. No. 4,615,235. However, these variable ratio brake pedal assemblies include complex linkage mechanisms.

SUMMARY OF THE INVENTION

One aspect of the present invention provides a variable ratio actuating assembly with an early increase of geometric ratio and a subsequent decrease. The actuating assembly is designed for installation in a vehicle to operate an input element (e.g., a brake booster rod or some other element that operates a vehicle component). The actuating assembly comprises a mount, an arm, an input portion and an input connector.

The mount is constructed to mount the actuating assembly in the vehicle in an operative position. The arm pivotally connects to the mount for movement in applying and releasing directions. The input portion is provided on a distal end portion of the arm for engagement by a user to allow the user to move the arm in the applying direction. The input connector is constructed to be connected to the input element on the vehicle when the actuating assembly is installed in the operative position.

The input connector is operatively connected to the arm for movement relative to the arm such that, when the assembly is mounted in the operative position and the input connector is connected to the input element of the vehicle, a ratio A/B varies as the arm moves in the applying direction from an initial position to a fully stroked position. A is a distance from the pivotal mounting of the arm to the input portion, and B is a distance from the pivotal mounting of the arm to the input connector. The variance of the ratio is such that the ratio (a) increases as the arm is moved from the initial position and reaches a maximum peak prior to moving 30% of a distance to the fully stroked position, and (b) then decreases as the ratio moves to the fully stroked position.

With this construction, the actuating assembly of this aspect of the invention provides an increased ratio at the beginning of the arm motion and a decreased ratio towards the end of the arm motion. When this aspect of the invention is implemented as a variable ratio brake pedal assembly this feature advantageously allows for an early peak in the pedal's force ratio desirable for situations such as booster assist failure situations, but only briefly so that overall pedal travel and "pedal feel" is more like a lower ratio pedal assembly. Also, when the pedal assembly is used for operating the vehicle brakes, an advantage of providing an early peak in pedal ratio is that this is when the operator's leg is in the best position to push down on the pedal in booster assist failure situations, and coinciding the early peak with this position provides for optimal leverage.

A related aspect of the invention provides a variable ratio actuating assembly with an early increase of its force ratio and a subsequent decrease. The actuating assembly is also designed for installation in a vehicle to operate an input element. The actuating assembly also comprises a mount, an arm, an input portion, and an input connector, similar to those described above. However, the input connector is operatively connected to the arm for movement relative to the arm such that, when the assembly is mounted in the operative position and the input connector is connected to the input element of the vehicle, a ratio $F_B/F_A$ varies as the arm moves from the initial position to the fully stroked position. $F_A$ is a force applied to the input portion by the user and $F_B$ is a force applied to the vehicle's input element by the input connector.

Another aspect of the invention provides a variable ratio actuating assembly that uses a cam guide structure to avoid the bar linkages of the prior art. This actuating assembly is also designed for installation in a vehicle to operate an input element. The actuating assembly comprises a mount, an arm, an input portion, a link member, an input connector, and a cam guide structure.

The mount is constructed to mount the actuating assembly in the vehicle in an operative position. The arm is pivotally connected to the mount for movement in an applying direction and a releasing direction. The arm has a guide slot, and the input portion is provided on a distal end portion of the arm for engagement by a user and to allow the user to move the arm in the applying direction.

The link member is pivotally connected to the arm. The link member has (a) a first guide element spaced apart from the pivotal connection of the link member and received in the guide slot of the arm, and (b) a second guide element spaced apart from the first guide element and the pivotal connection of the link member. The input connector is constructed to be connected to the input element on the vehicle when the actuating assembly is installed in the operative position. The input connector is provided on the link member. The cam guide structure provides a contoured cam surface, and the second guide element on the link member is engaged with the cam surface.

A configuration of the contoured cam surface, a configuration of the guide slot, and a configuration of the link member are such that, when the actuating assembly is mounted in the operative position and the input connector is connected to the input element of the vehicle, the second guide element engages the contoured cam surface so as to pivot the link member and move the input connector so that a ratio of A/B varies as the arm is moved in the applying direction from the initial position to the fully depressed position. As before, A is a distance from the pivotal mounting of the arm to the input portion, and B is a distance from the pivotal mounting of the arm to the input connector.

In a related aspect of the invention, the configuration of the contoured cam surface, a configuration of the guide slot, and a configuration of the link member are such that, when the actuating assembly is mounted in the operative position and the input connector is connected to the input element of the vehicle, the second guide element engages the contoured cam surface so as to pivot the link member and move the input connector so that a ratio of $F_B/F_A$ varies as the arm is moved in the applying direction from the initial position to the fully stroked position. $F_A$ is a force applied to the input portion and $F_B$ is a force applied to the vehicle's input element by the input connector.

Yet another aspect of the present invention is to provide a cam guided booster pin linkage assembly that provides a variable pedal ratio. The cam guided booster pin linkage assembly may be, as an option, retrofit to an existing pedal assembly having a substantially constant pedal ratio in order to convert the pedal assembly into a variable ratio pedal assembly having a variable pedal ratio. Of course, a variable ratio pedal assembly (including the cam guided booster pin linkage assembly) may be manufactured as an assembly on its own or may be processed through regular OEM (original equipment manufacture) plant line processes, thus providing a vehicle with a variable ratio pedal assembly during this processing operation.

Still another aspect of the present invention provides a method for converting a pedal assembly to a variable ratio configuration.

Other aspects, features and advantages of this invention will become apparent from the following detailed description when taken in conjunction with the accompanying drawings, which are a part of the disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
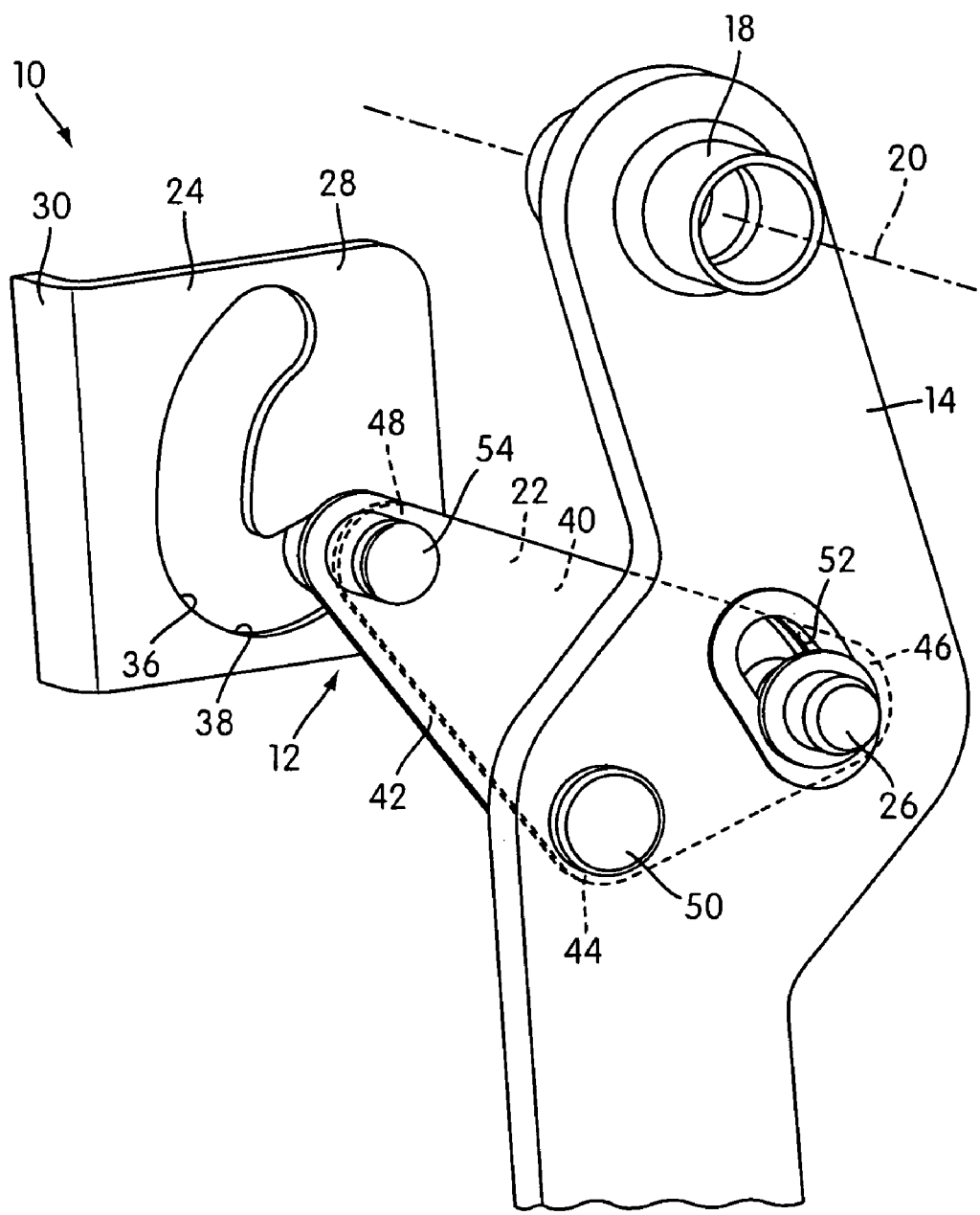
FIG. 1 is a left perspective view of a variable ratio pedal assembly including a cam guided booster pin linkage assembly constructed according to an embodiment of the present invention.
Figure 2:
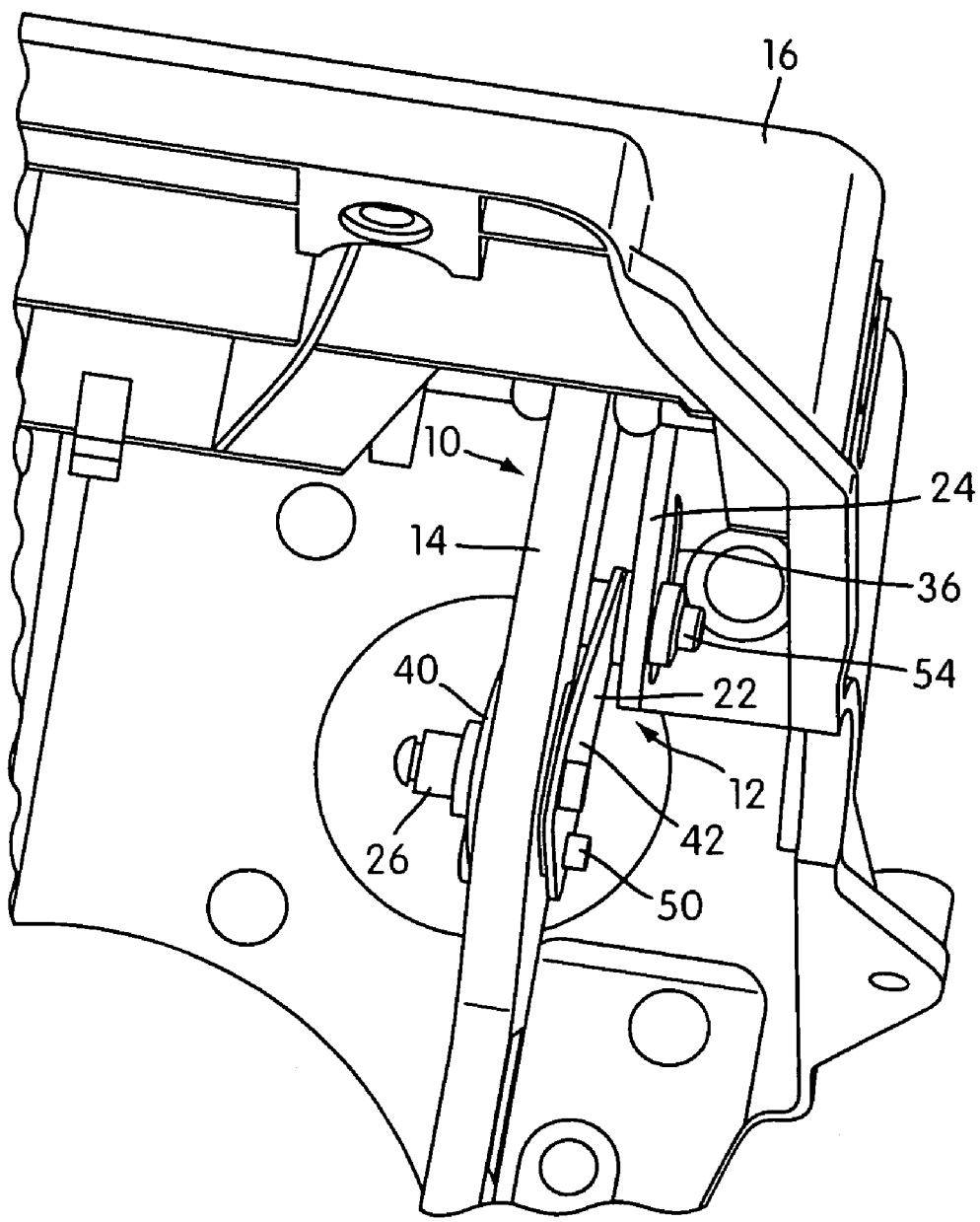
FIG. 2 is a rear perspective view of the variable ratio pedal assembly shown in FIG. 1 mounted to a mounting bracket provided in a vehicle.

FIGS. 1 and 2 illustrate a variable ratio actuating assembly 10 including a cam guided booster pin linkage assembly 12 constructed according to an embodiment of the present invention. In the illustrated embodiment, the actuating assembly 10 is in the form of a pedal assembly, and particularly a brake pedal assembly for a vehicle. The brake pedal assembly 10 may be of the adjustable-type or the conventional non-adjustable type. However, the assembly 10 may be a hand-operated parking brake assembly, a parking brake pedal assembly, or any other lever assembly having a lever for which a variable pedal ratio is desired.

Moreover, as an optional feature, the cam guided booster pin linkage assembly 12 may be retrofit to an existing pedal assembly having a substantially constant pedal ratio in order to convert the pedal assembly into a variable ratio pedal assembly having a variable pedal ratio. Thus, the cam guided booster pin linkage assembly 12 may be utilized with any type of pedal assembly including adjustable and non-adjustable pedal assemblies. Of course, a variable ratio pedal assembly (including the cam guided booster pin linkage assembly 12) may be manufactured as an assembly on its own or may be processed through regular OEM (original equipment manufacture) plant line processes, thus providing a vehicle with a variable ratio pedal assembly during this processing operation.

As shown in FIGS. 1 and 2, the pedal assembly 10 includes a pedal arm 14 that is pivotally mounted to a mounting structure 16, also referred to as a pedal mount, fixedly secured to the front dash of a vehicle. Specifically, the pedal arm 14 includes tubular mounting portions 18 at one end thereof that pivotally support the pedal arm 14 on a pivot pin provided on the pedal mount 16. The tubular mounting portions 18 define an operating pivot axis 20 that enables pivotal movement of the pedal arm 14 about the operating pivot axis 20 in applying and releasing directions. However, the pedal arm 14 may be pivotally mounted to the pedal mount 16 in any other suitable manner. Likewise, the pedal arm 14 may be adapted to be pivotally mounted to any type of pedal mount, such as a bracket mounted to the vehicle's firewall, or any other suitable structure.

The opposite distal end of the pedal arm 14 carries an input portion in the form of a pedal foot pad (not shown). In conventional pedal assemblies, the pedal foot pad is typically mounted directly to the opposite end of the pedal arm 14. Alternatively, the pedal foot pad may be provided on an adjustable pedal member that is operatively mounted to the pedal arm 14 (see example adjustable pedal assembly discussed below). However, the pedal arm 14 may have any other suitable configuration and may form a component of any suitable pedal assembly, e.g., adjustable and non-adjustable pedal assemblies. If the actuating assembly were a hand-operated type, such as a parking brake actuator with a hand lever, the input portion would be a hand grip portion or similar structure.

The cam guided booster pin linkage assembly 12 is operatively mounted between the mounting structure 16 and the pedal arm 14 to yield a pedal assembly 10 having a variable pedal ratio. Specifically, the linkage assembly 12 includes a link member 22 in the form of a booster pin linkage 22 and a cam guide structure 24. The cam guide structure 24 is operatively mounted to the pedal mount 16 provided on the vehicle adjacent the pedal arm 14. The booster pin linkage 22 is operatively connected between the pedal arm 14 and the cam guide structure 24. The booster pin linkage 22 also operatively connects to a brake booster pin 26 that is rotatably attached at its end to a master cylinder pushrod (i.e., a brake booster input element) configured to actuate the master cylinder for purposes of selectively engaging or disengaging the vehicles brakes, for example. The end where the push or booster rod connects to the booster pin 26 may be regarded as an input connector, as it establishes the connection between the vehicle input element and the pedal assembly 10. In other variations of the invention, the input connector may have any other construction and may connect to another type of input element in the vehicle. As the pedal assembly 10 is actuated, the relative movement between the linkage assembly 12 and the pedal arm 14 varies the pedal ratio in a manner discussed below. Preferably, the assembly 10 is used where the booster rod is associated with a power assist in the vehicle, as the increased pedal ratio is desirable in the event the power assist fails.

Figure 9:
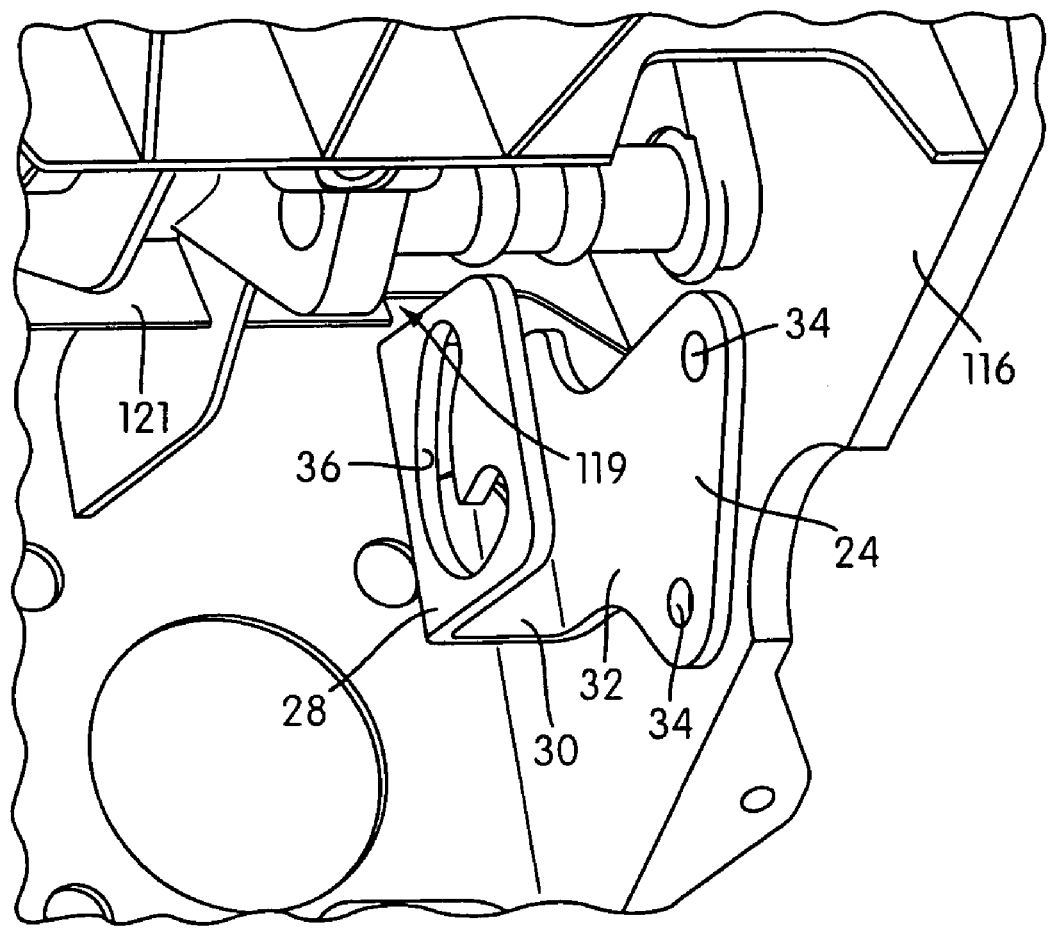
FIG. 9 is a perspective view of the cam guide structure of the cam guided booster pin linkage assembly shown in FIG. 1 mounted the vehicle mounting bracket shown in FIG. 8.

The cam guide structure 24 of the linkage assembly 12 is stamped from a piece of sheet metal and then folded or otherwise deformed in a conventional manner to provide the cam guide structure 24 with a base wall 28, an intermediate wall 30, and a retaining wall 32 that is parallel to the base wall 28 (see FIG. 9). The retaining wall 32 includes fastener receiving openings 34 formed therethrough. Fasteners, such as bolts, are inserted through the openings 34 to secure the cam guide structure 24 to the pedal mount 16 of the vehicle. However, the cam guide structure 24 may be secured to the pedal mount 16 in any other suitable method, such as by welding, for example. Also, the cam guide structure 24 may be adapted to be mounted to any type of pedal mount, such as the dash panel, instrument panel, and vehicle firewall, or any other suitable structure. The base wall 28 of the cam guide structure 24 includes an arcuate slot 36 formed therethrough that provides arcuate cam surfaces 38. In the illustrated embodiment, starting at its lower end, the arcuate slot 36 curves forwardly (to the left in FIG. 1) at an increasing ratio section and slightly downwardly and then curves sharply upwardly and slightly rearwardly (to the left in FIG. 1) at a decreasing ratio section. The arcuate slot 26 has a distinct shape that plays a part in determining the variation in the pedal ratio.

The booster pin linkage or link member 22 includes a pair of generally planar triangular-shaped members 40, 42. Each member 40, 42 includes a first end 44, a second end 46, and a third end 48. The first, second, and third ends 44, 46, 48 each include first, second, and third openings, respectively, therethrough. The first ends 44 of the members 40, 42 are pivotally mounted to the pedal arm 14 to allow the members to pivot about a pivot axis. Specifically, one of the members 40, 42 is positioned on one side of the pedal arm 14 and the other of the members 40, 42 is positioned on the other side of the pedal arm 14. A pivot pin 50 is inserted through the first opening in one of the members 40, 42, through an opening provided in the pedal arm 14, and through the first opening in the other of the members 40, 42 in order to pivotally mount the first ends 44 of the pair of members 40, 42 to the pedal arm 14.

The pedal arm 14 also includes an elongated guide slot 52 formed therethrough. The booster pin 26 is inserted through the second opening in one of the members 40, 42, through the elongated guide slot 52 provided in the pedal arm 14, and through the second opening in the other of the members 40, 42 in order to slidably mount the second ends 46 of the pair of members 40, 42 to the pedal arm 14. As noted above, the booster pin 26 is rotatably attached to the master cylinder pushrod configured to actuate the master cylinder. This arrangement allows the position of the booster pin 26 to change as the pedal arm 14 is stroked, which influences the pedal ratio in a manner discussed below.

Also, the third ends 48 of the members 40, 42 are slidably mounted to the cam guide structure 24. Specifically, a pin 54 is inserted through the third opening in one of the members 40, 42, through the third opening in the other of the members 40, 42, and through the arcuate slot 36 provided in the cam guide structure 24. As a result, outer surfaces of the pin 54 are slidably engaged with the arcuate cam surfaces 38 of the cam guide structure 24. This arrangement allows the third ends 48 of the members 40, 42 to travel within the arcuate slot 36 as the pedal arm 14 is stroked, which also influences the pedal ratio in a manner discussed below.

In an alternative embodiment, the booster pin linkage 22 may have only one generally planar triangular-shaped member. However, the booster pin linkage 22 may have any other suitable structure.

A bushing may be provided on each of the booster pin 26 and pin 54 for supporting the pins 26, 54 within respective slots 52, 36 and reducing frictional wear/noise during pivotal movement of the pedal arm 14 relative to the mounting structure 16 about the operating pivot axis 20. Also, the pins 26, 54 and respective slots 52, 36 may be heat treated to prevent wear.

In the illustrated embodiment, the booster pin 26 may be regarded as a first guide element and the pin 54 may be regarded as a second guide element because these pins guide the motion of the link member 22, as discussed below. Any suitable structures other than the illustrated pins may be used for these guide elements. Also, the input connector (i.e., the end of the booster pin) may be separate and spaced apart from the first guide element, although in the illustrated embodiment the input connector is coaxial with the first guide element (since it is part of the booster pin 26).

Figure 3:
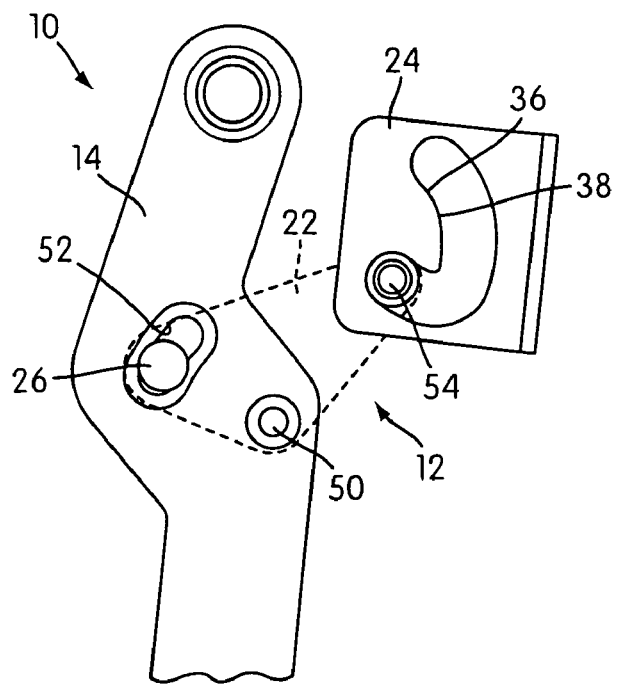
FIG. 3 is a right side view of the variable ratio pedal assembly shown in FIG. 1 in an initial position.
Figure 4:
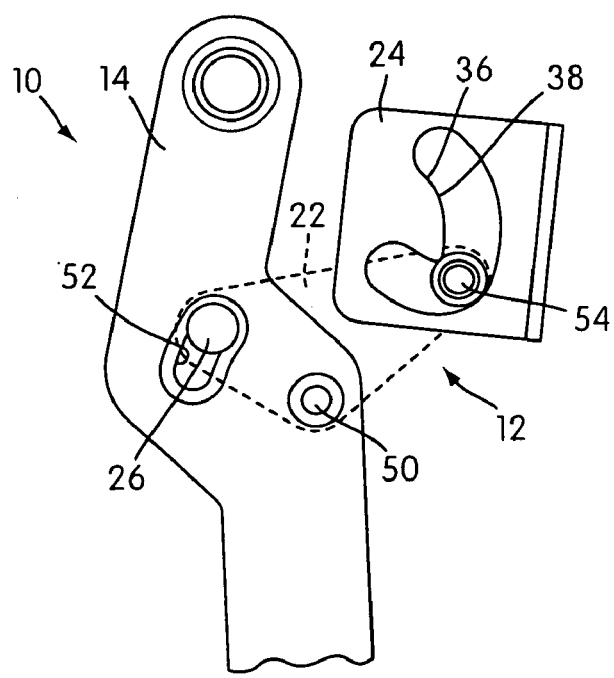
FIG. 4 is a right side view of the variable ratio pedal assembly shown in FIG. 1 in an intermediate position.
Figure 5:
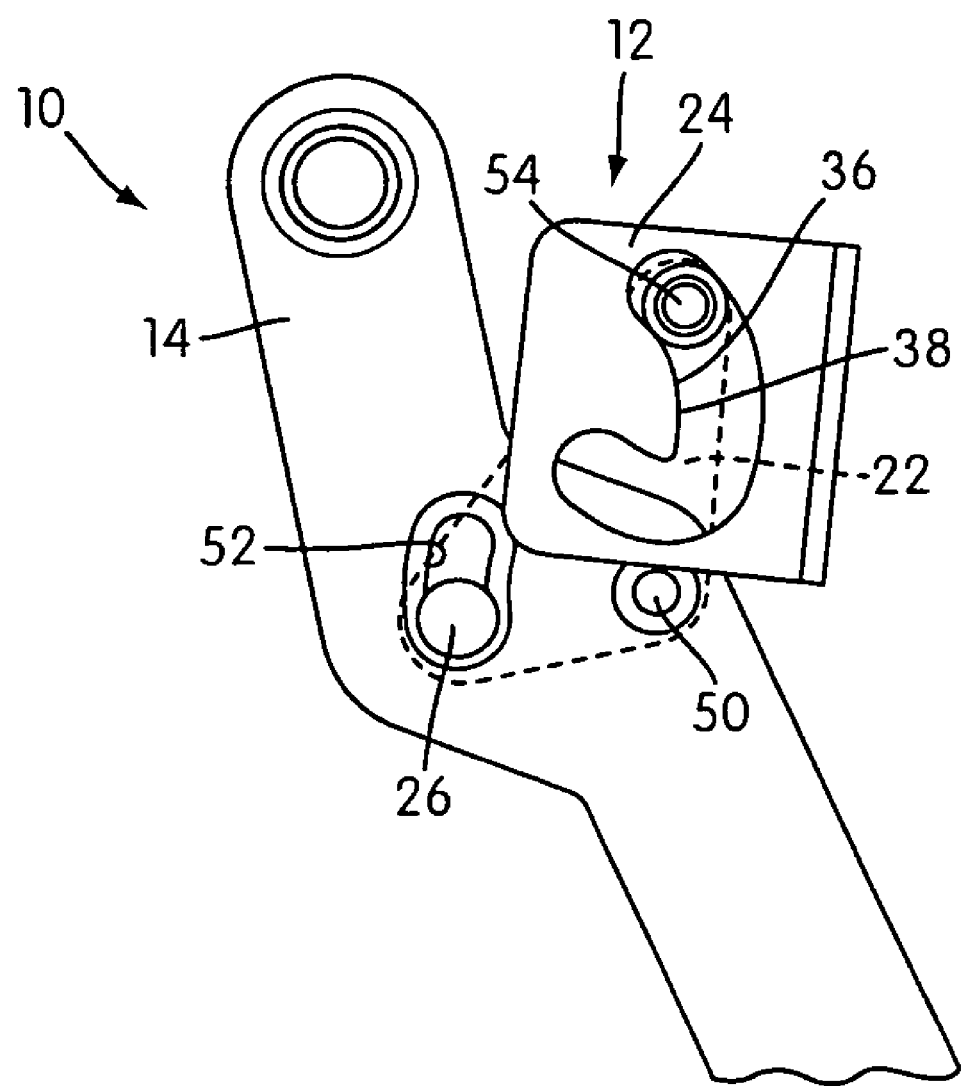
FIG. 5 is a right side view of the variable ratio pedal assembly shown in FIG. 1 in a fully stroked position.

FIGS. 3–5 illustrate the operation of the variable ratio pedal assembly 10 as it moves in the brake applying direction from an initial position towards its fully stroked or depressed position. In the initial position as shown in FIG. 3, the booster pin linkage 22 is positioned such that the pin 54 is positioned at a lower end of the arcuate slot 36 and the booster pin 26 is positioned at a lower end of the elongated slot 52. As the pedal arm 14 moves in the brake applying direction, the pin 54 is guided slightly downwardly by the arcuate cam surfaces 38 of the cam guide structure 24 which pivots the booster pin linkage 22 and moves the booster pin 26 upwardly towards an upper end of the elongated slot 52. FIG. 4 illustrates an intermediate position of the of the pedal assembly 10 wherein the pin 54 is positioned at an intermediate portion of the arcuate slot 36 and the booster pin 26 is positioned at an upper end of the elongated slot 52. Continued movement of the pedal arm 14 in the brake applying direction causes the pin 54 to be guided upwardly by the arcuate cam surfaces 38 of the cam guide structure 24, which pivots the booster pin linkage 22 and moves the booster pin 26 back downwardly towards the lower end of the elongated slot 52. FIG. 5 illustrates the pedal assembly 10 in its fully stroked or depressed position wherein the pin 54 is positioned at an upper end of the arcuate slot 36 and the booster pin 26 is positioned at a lower end of the elongated slot 52.

The interaction between the pedal arm 14 and its guide slot 46, the booster pin linkage 22, and the cam guide structure 24 and its contoured cam surface as determined by their respective configurations results in a variable geometric pedal ratio, which in turn varies the pedal's force ratio, both discussed below. Specifically, the illustrated pedal assembly 10 is structured so that the geometric pedal ratio is variable to provide a higher ratio at the beginning of the pedal stroke and a lower pedal ratio at the end of the pedal stroke. Likewise, the pedal's force ratio is also higher at the beginning of the pedal stroke, and lower towards the end. This allows for a higher initial application of force by the booster pin 26 and then a lower application of force by the booster pin 26 towards the end of the pedal stroke. Additionally, the lower pedal ratios towards the end of the pedal stroke allows sufficient travel of the booster push rod.

Figure 6:
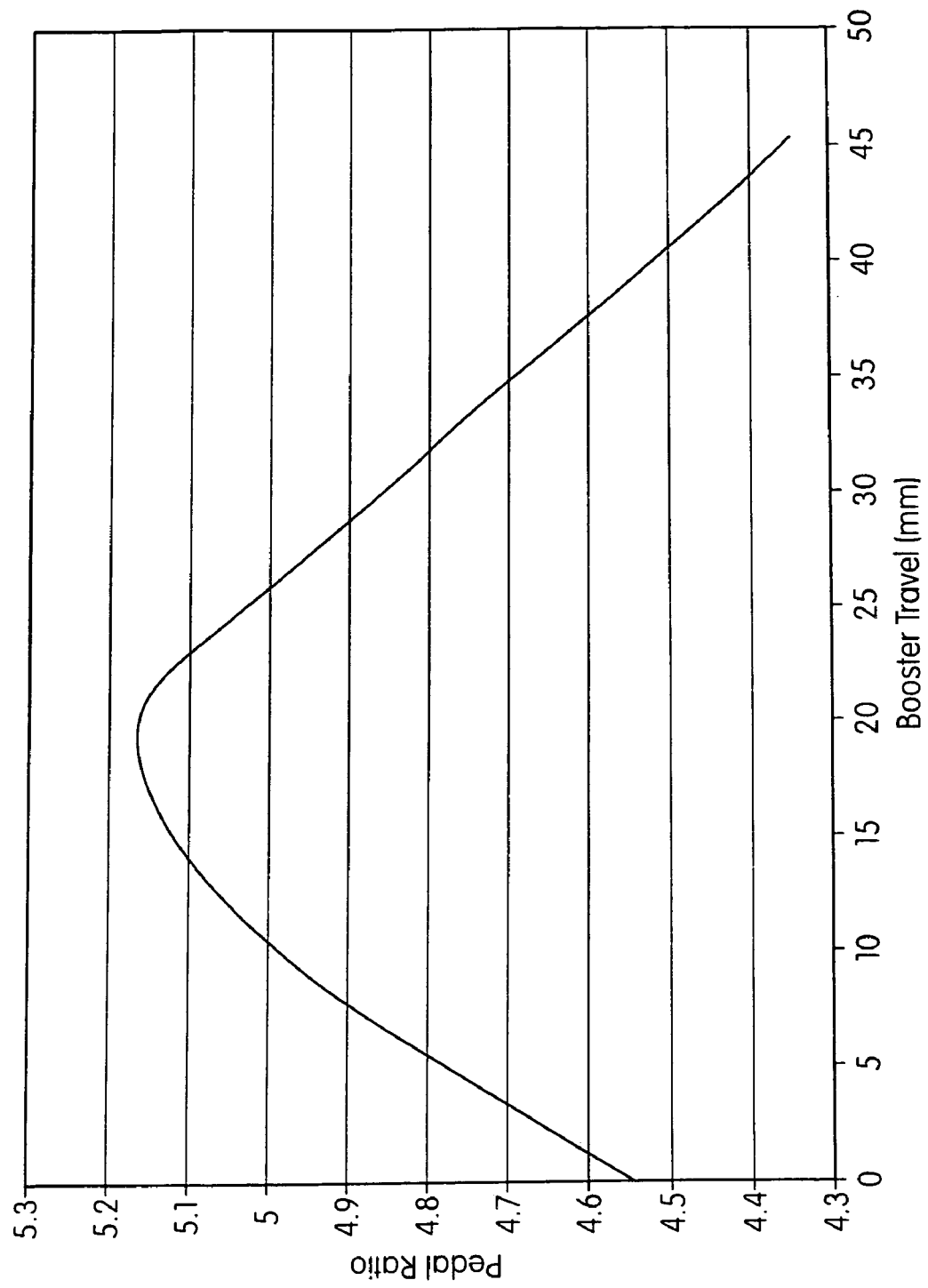
FIG. 6 is a graph of booster travel vs. pedal ratio for the variable ratio pedal assembly shown in FIG. 1.

FIG. 6 is a graph of booster travel vs. geometric pedal ratio for the variable ratio pedal assembly 10. As illustrated, the geometric pedal ratio sharply increases during the first half of booster travel and then decreases the remainder of booster travel. More specifically, the pedal assembly 10 initially has a pedal ratio of about 4.5, then the pedal ratio sharply increases to a pedal ratio of about 5.2 at its peak pedal ratio, and then the pedal ratio decreases to a pedal ratio of about 4.3 at its fully stroked position. The pedal's force ratio follows a similar curve, but it is affected somewhat by other factors such as the angle between the pedal arm 14 and the booster pin 26 and the reaction force against the cam guide structure 24, as discussed below.

Figure 7:
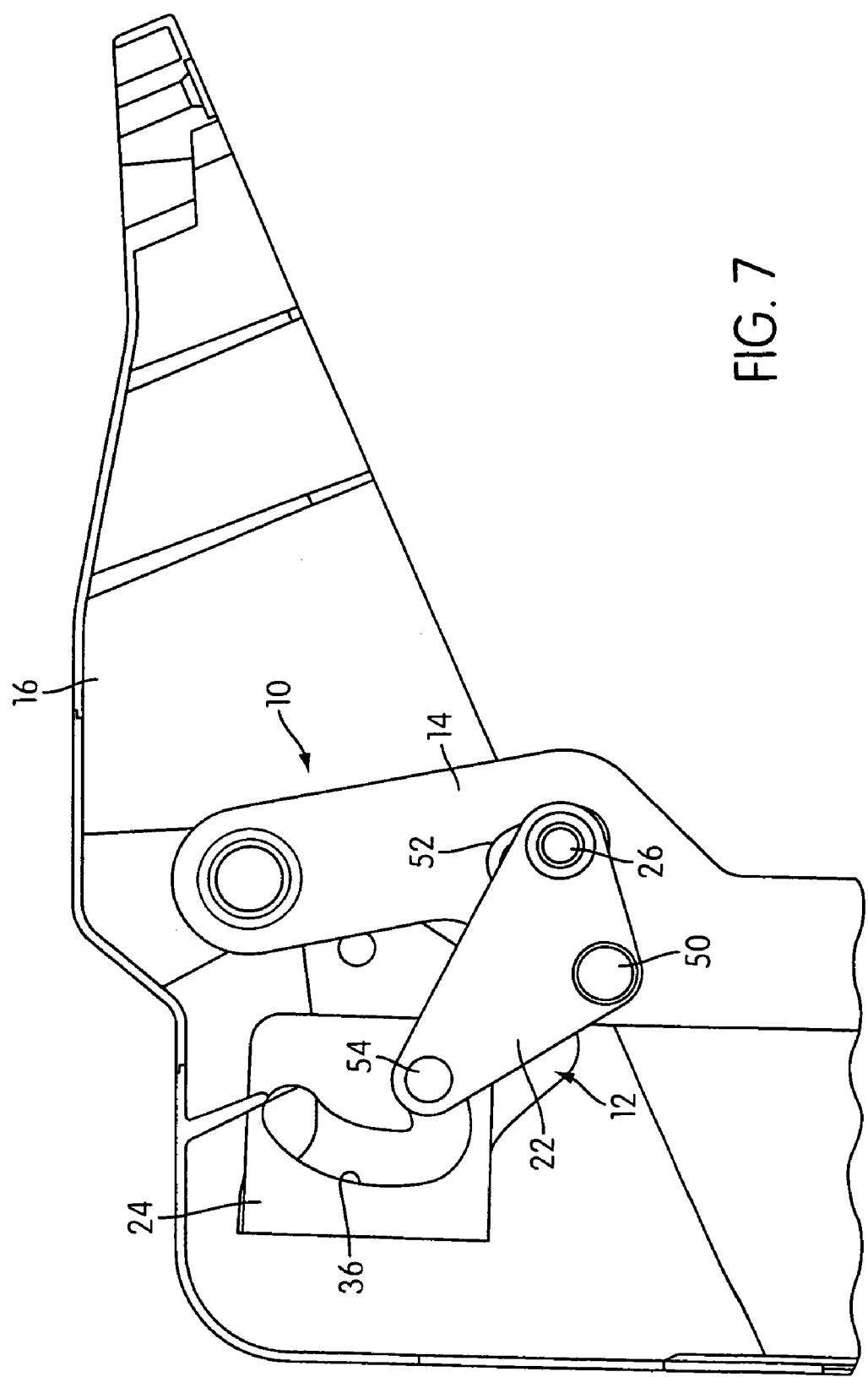
FIG. 7 is a left side view of variable ratio pedal assembly shown in FIG. 1.

FIG. 7 illustrates the travel of the booster pin 26 during a pedal stroke. As illustrated, the booster pin 26 travels within an angle of less than about 4°. The initial position, peak pedal ratio position, and final fully stroked position of the booster pin 26 is also illustrated.

The geometric pedal ratio is typically expressed as $R=a/b$, where a is the distance between the operating pivot axis 20 and the actuation point on the pedal foot pad (or other input portion, such as a hand grip in the case of a hand-operated lever) and b is the distance between the operating pivot axis 20 and the master cylinder pushrod attachment point, i.e., the booster pin 26. However, because the components of the pedal assembly 10 have a variable relationship rather than a fixed relationship, the geometric pedal ratio expression does not remain constant and varies as the pedal arm 14 travels. That is, both the relative movement of the booster pin 26 with respect to the pedal arm 14 and the relative movement of the pin 54 with respect to the cam guide structure 24 play a part in determining the geometric ratio.

Accordingly, the geometry of the linkage assembly 12 may be customized in order to customize the variation of the pedal's force ratio. That is, the linkage assembly 12 may be modified to yield a customized variable pedal ratio output. For example, the shape and size of the arcuate slot 36 in the cam guide structure 24, the shape and size of the elongated slot 52 in the pedal arm 14, and the configuration of the booster pin linkage 22 may be modified in order to generate a desired variation of pedal ratio through a pedal stroke. Accordingly, the graphs and structure of the variable ratio pedal assembly 10 is only exemplary and may be modified in order to accommodate certain needs of a particular vehicle or an operator.

In general, the geometric ratio will sharply peak during the first half of booster travel and then thereafter decrease during the remainder of booster travel. In one embodiment, the geometric ratio peaks within 25–30% of pedal arm travel. Likewise, the pedal's force ratio preferably increases sharply and peaks in the first 25–30% of pedal arm travel. However, the magnitude and location along the booster and arm travel of each of the initial pedal ratios, peak pedal ratios, and the pedal ratios at the fully stroked position, for example, may vary in order to accommodate certain vehicles. Also, the average slope between the initial pedal ratios and the peak pedal ratios, and the average slope between the peak pedal ratios and the pedal ratios at the fully stroked position may vary in order to accommodate certain vehicles.

That is, the variable ratio pedal assembly provides a peak force ratio at the beginning of the braking action, e.g., first 25 or 30% of pedal arm and booster travel, which is desirable for booster assist failure situations, or other situations where it is desirable to have increased leverage in the early part of the movement. This peak force ratio is vehicle specific and ensures that sufficient force is applied to the brake system. Then, the remainder of the pedal travel has decreased geometric and force ratios so that overall pedal travel and "pedal feel" is more like a lower ratio pedal assembly.

As illustrated in FIG. 6, the peak geometric pedal ratio is higher than the initial geometric pedal ratio, and the geometric pedal ratio at the fully stroked position is less than the initial pedal ratio. Likewise, as mentioned above, the force ratio follows a similar curve. This allows the variable ratio pedal assembly to have an average force ratio for the entire pedal stroke that is less than the peak force pedal ratio. The average pedal ratio relates to booster pin travel and should be sufficiently high to ensure a full stroke of the master cylinder push rod.

Likewise, the pedal's force ratio is related to the varying geometric ratio. In a theoretically perfect system, where reaction or friction forces are not taken into account, the output force $F_B$ applied by the input connector to the vehicle's input element is related to the input force $F_A$ applied to the input portion (i.e., the pedal pad) by the user by the equation $F_B \approx (a/b)F_A$, and thus the force ratio $F_B/F_A \approx a/b$. The change in angle between the pedal arm 14 and the booster pin 26 does vary this relationship somewhat, but it is not very significant and the approximate ratio of $F_B/F_A \approx a/b$ can be used in most instances. Also, in reality there will be a reaction force where the pin 54 bears against the cam guide structure 24, and there may be some frictional forces in the system, the relationship is more accurately described by the equation $F_B \approx (a/b)F_A - F_C$. $F_C$ represents the reaction force and any frictional forces. Regardless, the force ratio $F_B/F_A$ is still mostly dependent on the geometric ratio a/b, even though the angular relation between the pedal arm 14 and booster pin 26 and resistance represented by $F_C$ do have some effect.

The convex curve or variation in the pedal's geometric and force ratios may be customized for certain vehicles to provide the desired peak force ratio for booster assist failure situations and the necessary average force ratio for "pedal feel" and booster pin travel. That is, if the vehicle requires a certain peak force ratio, the initial force ratio and the final force ratio at the fully stroked position can be selected in order to have a desired average force ratio.

As noted above, the cam guided booster pin linkage assembly 12 may be retrofit to an existing pedal assembly having a substantially constant pedal ratio in order to convert the pedal assembly into a variable ratio pedal assembly having a variable pedal ratio. When retrofitting the cam guided booster pin linkage assembly 12 to an existing pedal assembly, modifications may need to be made to the mounting structure of the vehicle and/or to the pedal arm of the existing pedal assembly in order to accommodate the cam guided booster pin linkage assembly 12.

Figure 8:
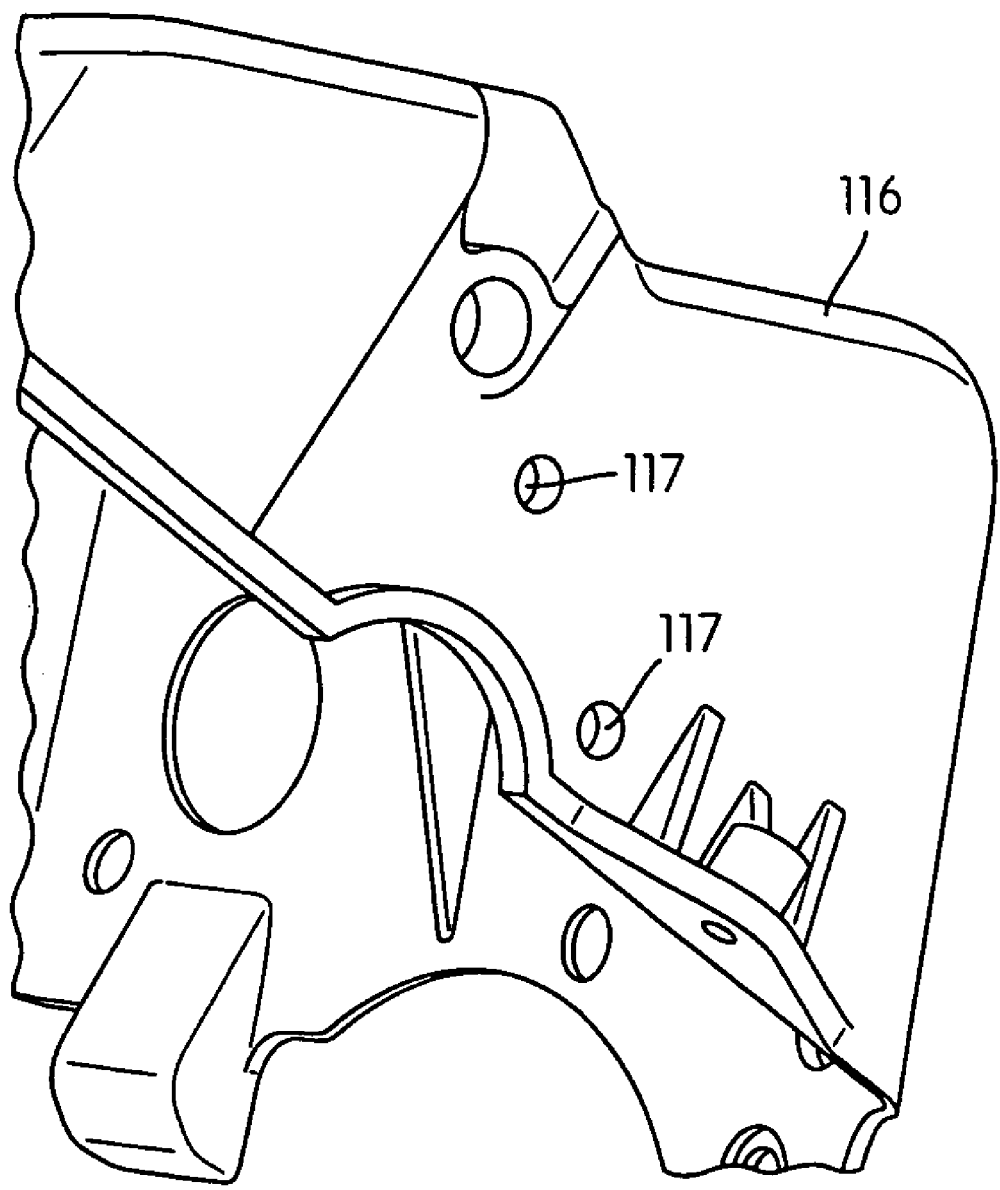
FIG. 8 is a perspective view of a mounting bracket provided in a vehicle having openings for mounting a cam guide structure of the cam guided booster pin linkage assembly shown in FIG. 1.

For example, FIGS. 8 and 9 illustrate modifications that may need to be made to the mounting structure or pedal mount 116 of a vehicle in order to accommodate the cam guide structure 24 of the cam guided booster pin linkage assembly 12. As shown in FIG. 8, two new holes 117 may be required in the pedal mount 116 in order to secure the cam guide structure 24 to the pedal mount 116 with fasteners. As shown in FIG. 9, a small relief 119 may be provided on an internal rib 121 of the pedal mount 116 in order to provide sufficient clearance for the cam guide structure 24.

With respect to the pedal arm of an existing pedal assembly, an opening may be formed in the pedal arm for pivotally mounting the pair of members 40, 42 of the booster pin linkage 22 thereto. Additionally, an elongated slot may be formed in the pedal arm for receipt of the booster pin 26 therethrough.

Figure 10:
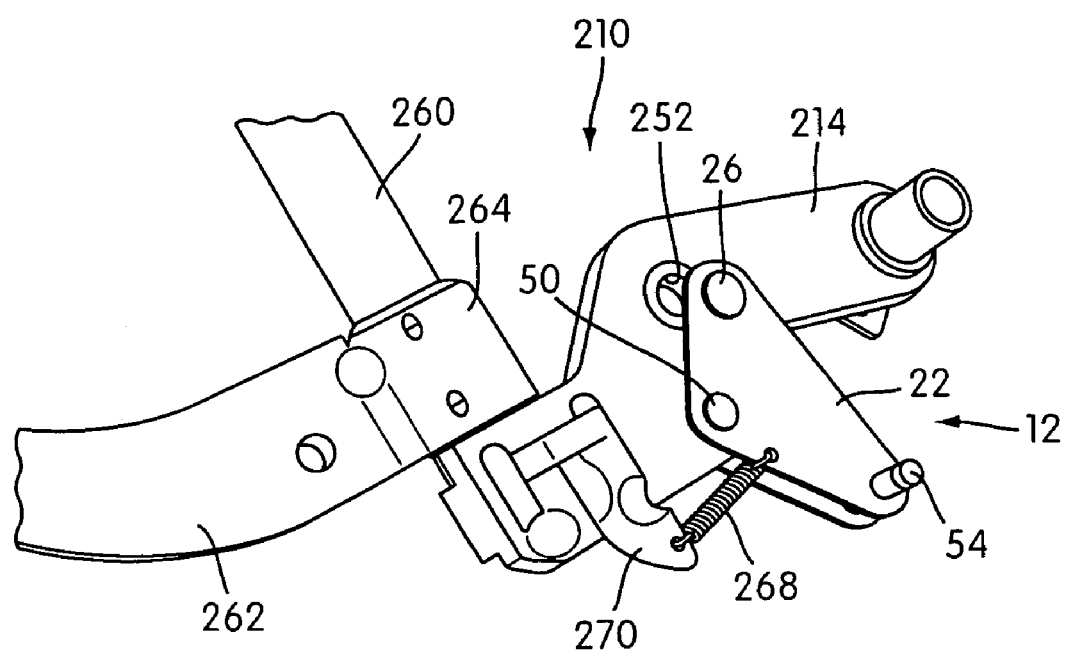
FIG. 10 is a right perspective view of the cam guided booster pin linkage assembly shown in FIG. 1 retrofit to an adjustable pedal assembly.
Figure 11:
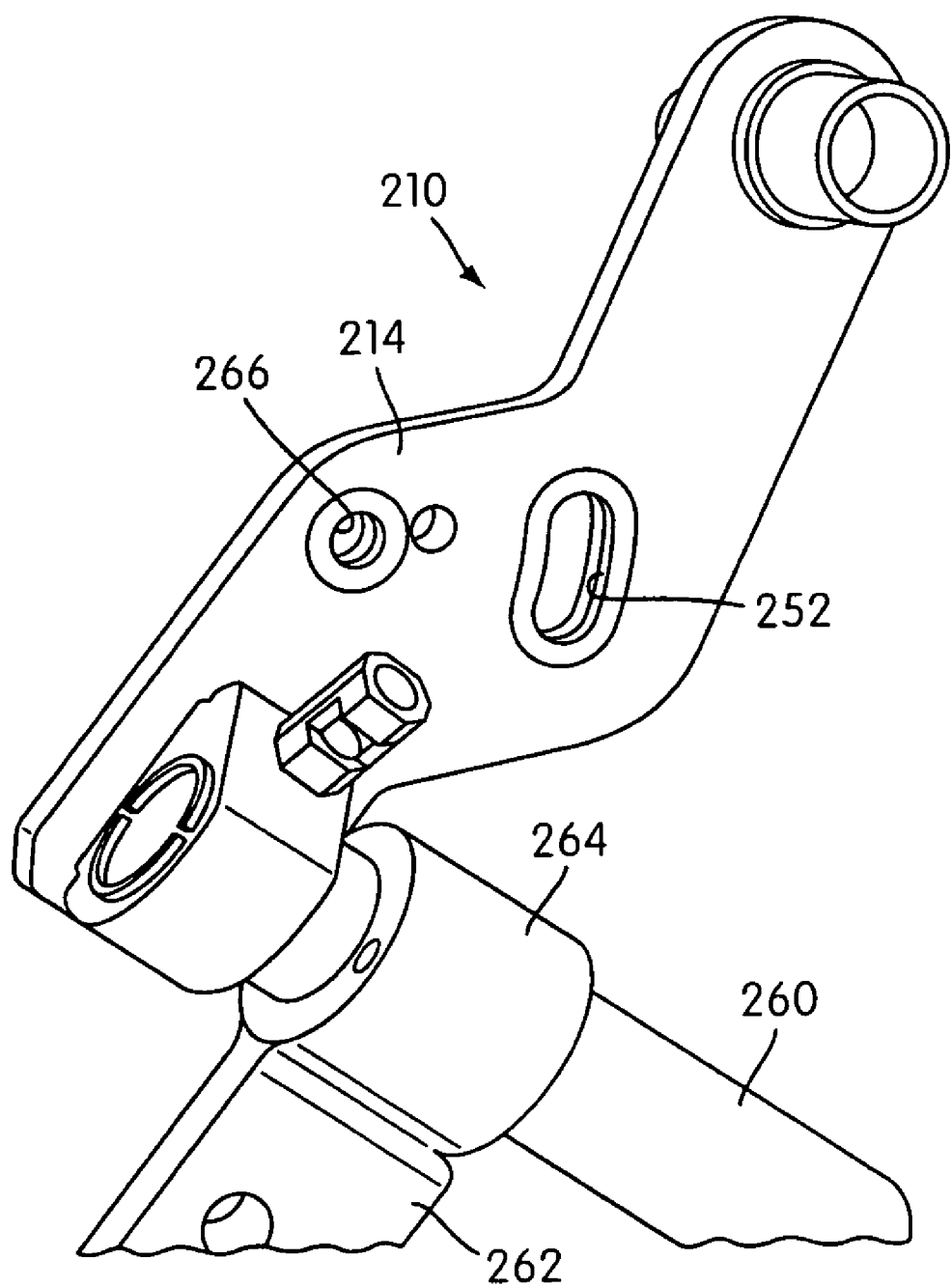
FIG. 11 is a perspective view of a modified pedal arm of the adjustable pedal assembly shown in FIG. 10 in order to mount the cam guided booster pin linkage assembly shown in FIG. 1.

FIGS. 10 and 11 illustrate the cam guided booster pin linkage assembly 12 retrofit to an existing adjustable pedal assembly 210. That is, the adjustable pedal assembly 210 has been converted from a first configuration to a second configuration. In the first configuration, the adjustable pedal assembly 210 was structured to provide a substantially constant pedal ratio. In the second configuration as shown, the linkage assembly 12 is operatively connected to the adjustable pedal assembly 210 to yield an adjustable pedal assembly 210 having a variable pedal ratio.

In the illustrated embodiment, the adjustable pedal assembly 210 in its first, preexisting configuration is manufactured by Teleflex. Further details of this adjustable pedal assembly 210 can be found in U.S. Pat. No. 5,890,399, the entirety of which is incorporated into this application by reference.

In general, the Teleflex adjustable pedal assembly 210 in its first, preexisting configuration includes a pivot arm 214 that is pivotally mounted at its upper end to a mounting bracket provided in the vehicle. A guide rod structure 260 is mounted to the pivot arm 214. A pedal member 262 includes a pedal pad at its lower end and a hub structure 264 at an upper end. The hub structure 264 is slidably mounted on the guide rod structure 260 to enable the pedal member 262 to move axially forwardly and rearwardly with respect to the guide rod structure 260. A drive assembly may be operatively connected to the pedal member 262 in order to selectively drive the pedal member 262 forwardly and rearwardly along the guide rod structure 260. This arrangement allows the operator to selectively adjust the position of the pedal pad depending on the preference and physical characteristics of the operator.

The linkage assembly 12 is not an original part of the adjustable pedal assembly 210 and is provided to retrofit the adjustable pedal assembly 210 into its second variable pedal ratio configuration. As shown in FIG. 11, an opening 266 is formed in the pivot arm 214 for pivotally mounting the pair of members 40, 42 of the booster pin linkage 22 thereto. Additionally, an elongated slot 252 is formed in the pivot arm 214 for receipt of the booster pin 26 therethrough.

As shown in FIG. 10, a biasing structure 268 is mounted between the pivot arm 214 and the booster pin linkage 22 in order to bias the pins 26, 54 (i.e., first and second guide elements) into continuous engagement with the respective slots 52, 36. This prevents any rattling of the pins 26, 54 with the slots 52, 36. In the illustrated embodiment, the biasing structure 268 is a spring. However, the biasing member 268 may have any other suitable structure for biasing the booster pin linkage 22, e.g., springs, resilient polymeric structures, etc. An attachment plate 270 is welded to the pivot arm 214 in order to provide an attachment point for the biasing structure 268 on the pivot arm 214.

However, any other suitable adjustable pedal assembly may be retrofit with the linkage assembly 12 in a similar manner. Also, the linkage assembly 12 may be retrofit to a conventional non-adjustable pedal arm assembly in a similar manner as discussed above with respect to the adjustable pedal assembly. That is, the pedal arm would need to be modified to include an opening for pivotally mounting the pair of members 40, 42 of the booster pin linkage 22 and an elongated slot for receipt of the booster pin 26. Further, an attachment plate may be added to the pedal arm to provide an attachment point for a biasing structure.

Figure 12:
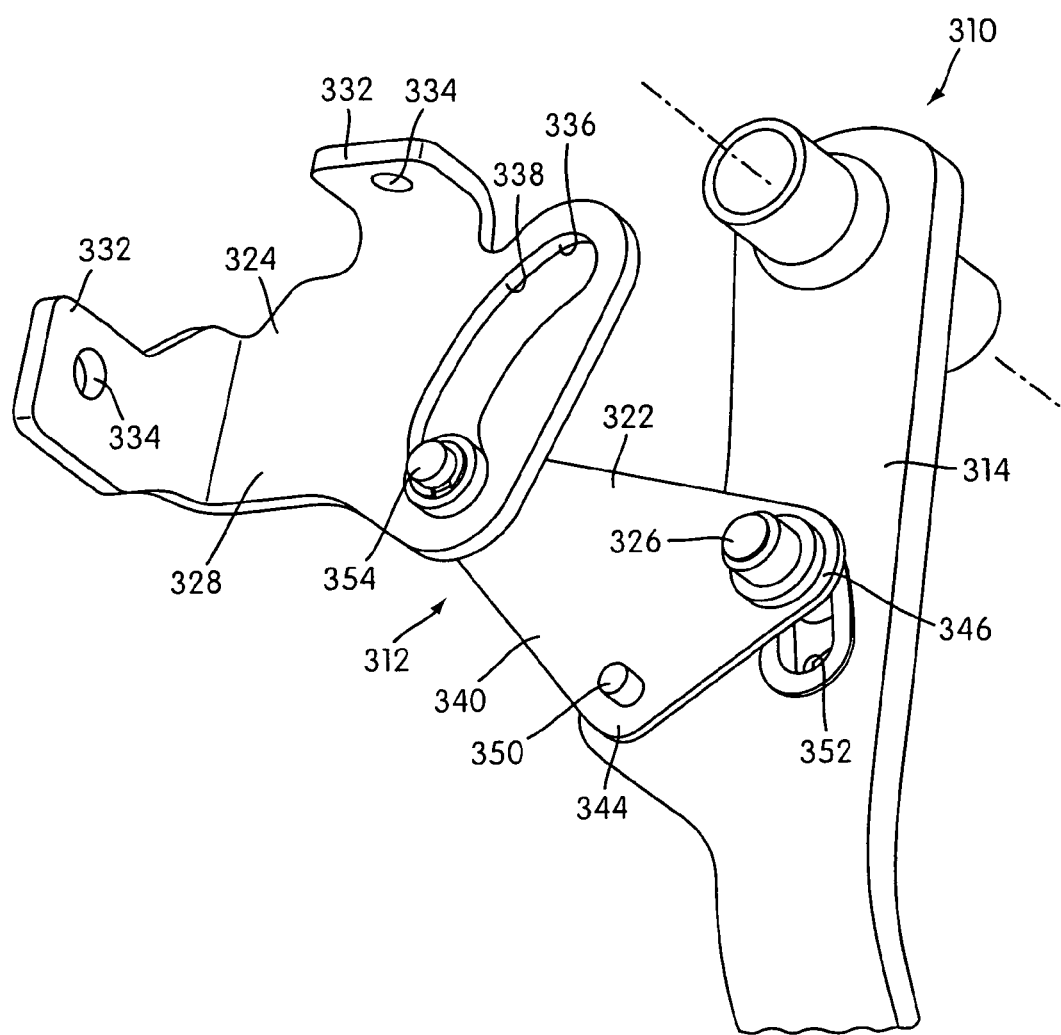
FIG. 12 is a left perspective view of a variable ratio pedal assembly including a cam guided booster pin linkage assembly constructed according to another embodiment of the present invention.
Figure 13:
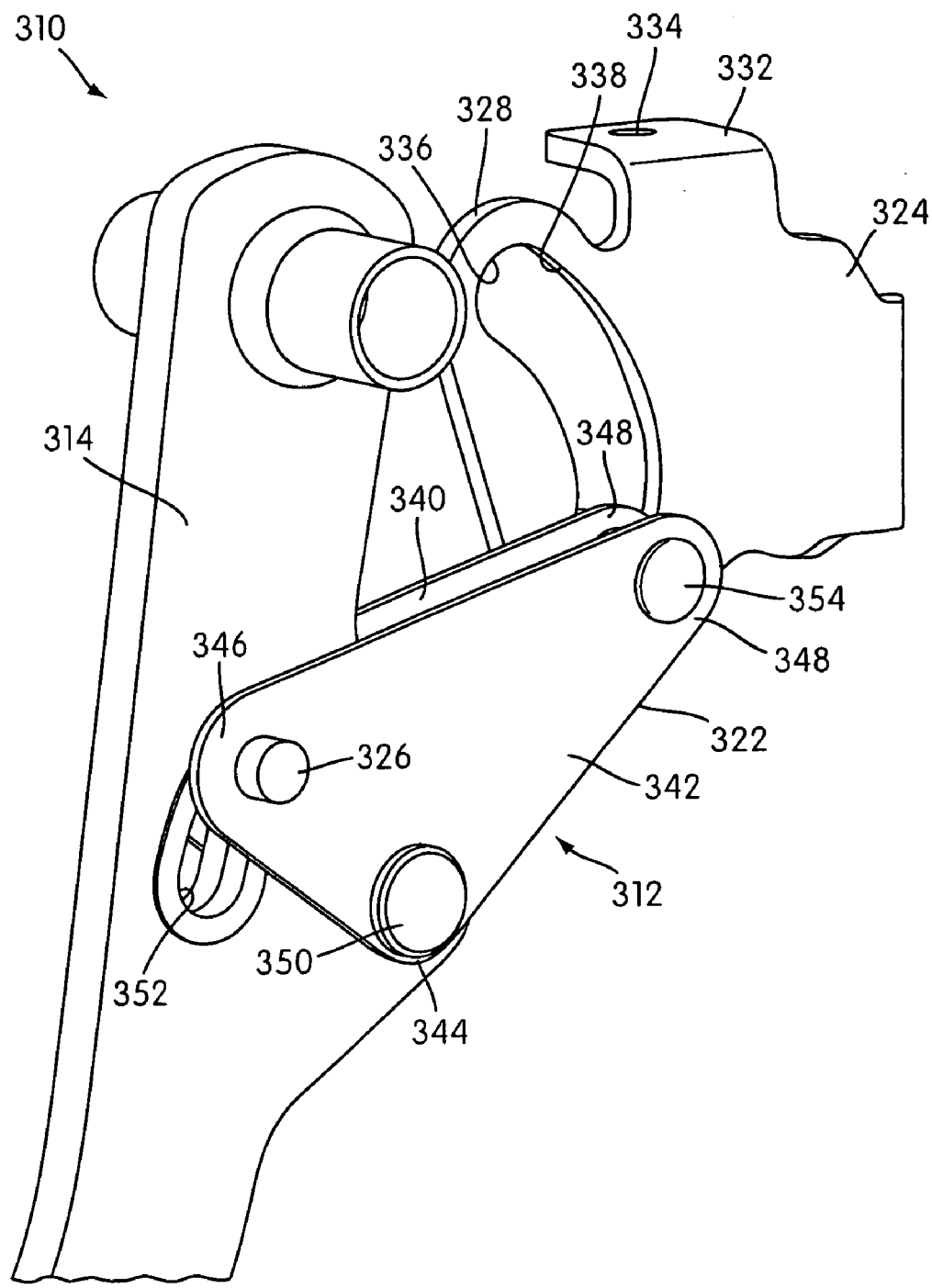
FIG. 13 is a right perspective view of the variable ratio pedal assembly shown in FIG. 12.

FIGS. 12 and 13 illustrate another embodiment of a cam guided booster pin linkage assembly 312 mounted to a pedal assembly 310. Similar to the linkage assembly 12 discussed above, the linkage assembly 312 includes a booster pin linkage 322 and a cam guide structure 324. The cam guide structure 324 is operatively mounted to the mounting structure provided on the vehicle. The booster pin linkage 322 is operatively connected between the pedal arm 314 and the cam guide structure 324.

The cam guide structure 324 of the linkage assembly 312 is stamped form a piece of sheet metal and then folded or otherwise deformed in a conventional manner to provide the cam guide structure 324 with a base wall 328, and a pair of retaining walls 332 that extend transverse to the base wall 328. The retaining walls 332 each include a fastener receiving opening 334 formed therethrough. Fasteners, such as bolts, are inserted through the openings 334 to secure the cam guide structure 324 to the mounting structure of the vehicle. However, the cam guide structure 324 may be secured to the mounting structure in any other suitable method, such as by welding, for example. The base wall 328 of the cam guide structure 324 includes an arcuate slot 336 formed therethrough that provides arcuate cam surfaces 338.

In the illustrated embodiment, the arcuate slot 336 in the cam guide structure 324 is in the form of a spline curve that is produced from a series of arcs having different radii. The curvature of the arcuate slot 336 has a direct effect on the variation of the pedal ratios and may be customized in order to customize the variation of the pedal ratios.

The booster pin linkage 322 includes a pair of generally planar triangular-shaped members 340, 342. Each member 340, 342 includes a first end 344, a second end 346, and a third end 348. The first, second, and third ends 344, 346, 348 each include first, second, and third openings, respectively, therethrough. The first ends 344 of the members 340, 342 are pivotally mounted to the pedal arm 314 to allow the members 340, 342 to pivot about a pivot axis. Specifically, one of the members 340, 342 is positioned on one side of the pedal arm 314 and the other of the members 340, 342 is positioned on the other side of the pedal arm 314. A pivot pin 350 is inserted through the first opening in one of the members 340, 342, through an opening provided in the pedal arm 314, and through the first opening in the other of the members 340, 342 in order to pivotally mount the first ends 344 of the pair of members 340, 342 to the pedal arm 314.

The pedal arm 314 also includes an elongated slot 352 formed therethrough. A booster pin 326 (i.e., a first guide element) is inserted through the second opening in one of the members 340, 342, through the elongated slot 352 provided in the pedal arm 314, and through the second opening in the other of the members 340, 342 in order to slidably mount the second ends 346 of the pair of members 340, 342 to the pedal arm 314. The booster pin 326 is rotatably attached to the master cylinder pushrod.

Also, the third ends 348 of the members 340, 342 are slidably mounted to the cam guide structure 324. Specifically, a pin 354 (i.e., a second guide element) is inserted through the third opening in one of the members 340, 342, through the third opening in the other of the members 340, 342, and through the arcuate slot 336 provided in the cam guide structure 324. As a result, outer surfaces of the pin 354 are slidably engaged with the arcuate cam surfaces 338 of the cam guide structure 324.

A bushing may be provided on each of the booster pin 326 and pin 354 for supporting the pins 326, 354 within respective slots 352, 336 and reducing frictional wear/noise during pivotal movement of the pedal arm 314 relative to the mounting structure about the operating axis. Also, the pins 326, 354 and respective slots 352, 336 may be heat treated to prevent wear.

In operation, the booster pin linkage 322 is initially positioned such that the pin 354 is positioned at a lower end of the arcuate slot 336 and the booster pin 326 is positioned at an upper end of the elongated slot 352. As the pedal arm 314 moves in the brake applying direction, the pin 354 is guided upwardly by the arcuate cam surfaces 338 of the cam guide structure 324 which pivots the booster pin linkage 322 and moves the booster pin 326 downwardly towards a lower end of the elongated slot 352.

Figure 14:
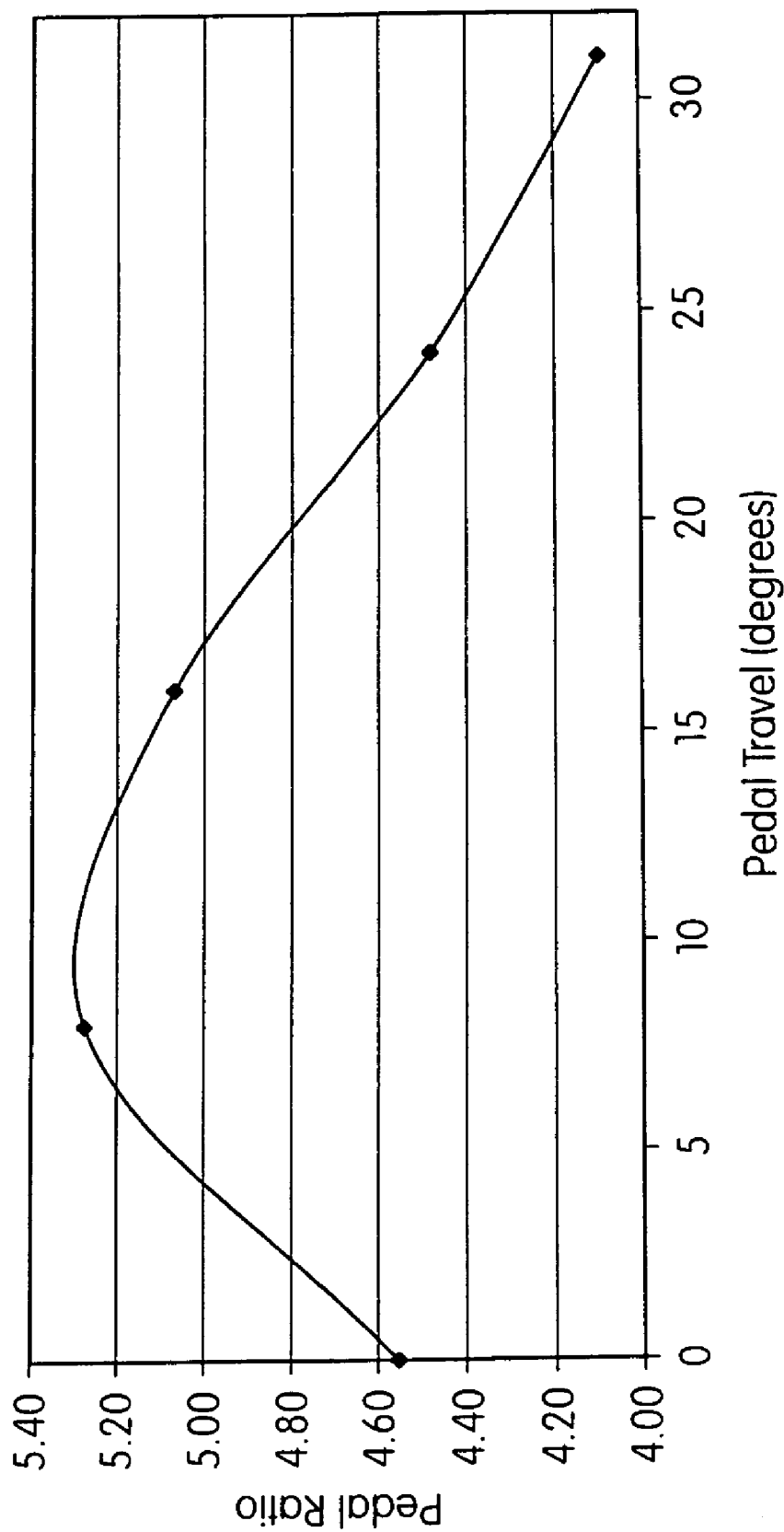
FIG. 14 is a graph of pedal travel vs. pedal ratio for the variable ratio pedal assembly shown in FIG. 12.

FIG. 14 is a graph of pedal travel vs. geometric pedal ratio for the variable ratio pedal assembly 310. As illustrated, the geometric pedal ratio sharply peaks during the first half of pedal travel and then thereafter decreases during the remainder of pedal travel. Also, the different configuration of the linkage assembly 312 with respect to the linkage assembly 12 results in a different variation of the pedal ratio (e.g., compare FIGS. 6 and 14). This exemplifies the aspect that the shape and size of the arcuate slot 36, 336 in the cam guide structure 24, 324, the shape and size of the elongated slot 52, 352 in the pedal arm 14, 314, and the configuration of the booster pin linkage 22, 322 may be modified in order to generate a desired variation of pedal ratio through a pedal stroke. These changes will likewise affect the force ratio as well.

It can thus be appreciated that the aspects of the present invention have been fully and effectively accomplished. The foregoing specific embodiments have been provided to illustrate the structural and functional principles of the present invention, and are not intended to be limiting. To the contrary, the present invention is intended to encompass all modifications, alterations and substitutions within its spirit and scope.

What is claimed:

1. A brake pedal actuating assembly for installation in a vehicle to operate a brake booster input element on the vehicle, the actuating assembly comprising:

a pedal mount constructed to mount the actuating assembly in the vehicle in an operative position;

a pedal arm with a guide slot, the pedal arm being pivotally connected to the mount for movement in an applying direction from an initial position to a fully stroked position, and in a releasing direction from the fully stroked position to the initial position;

an input portion provided as a pedal pad on a distal end portion of the arm for engagement by a user's foot to allow the user to move the arm in the applying direction; and an input connector constructed to be connected to the brake booster input element on the vehicle when the actuating assembly is installed in the operative position;

the input connector being operatively connected to the arm for movement relative to the arm such that, when the actuating brake pedal assembly is mounted in the operative position and the input connector is connected to the brake booster input element of the vehicle, a ratio of A/B varies as the arm is moved in the applying direction from the initial position to the fully stroked position, wherein A is a distance from the pivotal mounting of the arm to the input portion and B is a distance from the pivotal mounting of the arm to the input connector;

the variance of the ratio as the arm is moved in the applying direction being such that (a) the ratio increases as the arm is moved from the initial position and reaches a maximum peak prior to moving 30% of a distance to the fully stroked position, and (b) then decreases as the arm moves to the fully stroked position;

a link member pivotally connected to the pedal arm, the link member having (a) a first guide element spaced apart from the pivotal connection of the link member and received in the guide slot of the pedal arm, and (b) a second guide element spaced apart from the first guide element and the pivotal connection of the link member, the input connector being provided on the link member;

a cam guide structure providing a contoured cam surface, the second guide element on the link member being engaged with the cam surface of the cam guide structure; and a configuration of the contoured cam surface, a configuration of the guide slot, and a configuration of the link member being such that, when the pedal assembly is mounted in the operative position and the input connector is connected to the brake booster input element of the vehicle, the second guide element engages the contoured cam surface so as to pivot the link member and move the input connector to vary the ratio as the pedal arm is moved in the applying direction.

2. An actuating assembly according to claim 1, wherein the variance of the ratio as the pedal arm is moved in the applying direction is such that the ratio reaches the maximum peak prior to moving 25% of the distance to the fully stroked position.

3. An actuating assembly according to claim 1, wherein the cam guide structure is separate from the mount and is constructed to be mounted in the vehicle separately from the mount.

4. An actuating assembly according to claim 3, wherein the contoured cam surface has an increasing ratio section and a decreasing ratio section, the configuration of the cam surface being such that, when the pedal arm is mounted in the operative position and the input connector is connected to the brake booster input element of the vehicle, (a) the second guide element engages the increasing ratio section of the contoured cam surface so as to pivot the link member and move the input connector so that the ratio increases as the pedal arm is moved in the applying direction from the initial position and reaches the maximum peak, and (b) then engages the decreasing ratio section of the contoured cam surface so as to pivot the link member and move the input connector so that the ratio decreases as the pedal arm moves to the fully depressed position.

5. An actuating assembly according to claim 1, wherein the input connector is coaxial with the first guide element.

6. An actuating assembly according to claim 4, wherein the input connector is coaxial with the first guide element.

7. An actuating assembly for installation in a vehicle to operate an input element on the vehicle, the pedal assembly comprising:

a mount constructed to mount the actuating assembly in the vehicle in an operative position;

an arm pivotally connected to the mount for movement in an applying direction from an initial position to a fully stroked position, and in a releasing direction from the fully stroked position to the initial position, the arm having a guide slot;

an input portion provided on a distal end portion of the arm for engagement by a user to allow the user to move the arm in the applying direction; and a link member pivotally connected to the arm, the link member having (a) a first guide element spaced apart from the pivotal connection of the link member and received in the guide slot of the arm, and (b) a second guide element spaced apart from the first guide element and the pivotal connection of the link member;

an input connector constructed to be connected to the input element on the vehicle when the actuating assembly is installed in the operative position, the input connector being provided on the link member;

a cam guide structure providing a contoured cam surface, the second guide element on the link member being engaged with the cam surface of the cam guide structure;

a configuration of the contoured cam surface, a configuration of the guide slot, and a configuration of the link member being such that, when the actuating assembly is mounted in the operative position and the input connector is connected to the input element of the vehicle, the second guide element engages the contoured cam surface so as to pivot the link member and move the input connector so that a ratio of A/B varies as the arm is moved in the applying direction from the initial position to the fully stroked position, wherein A is a distance from the pivotal mounting of the arm to the input portion and B is a distance from the pivotal mounting of the arm to the input connector.

8. An actuating assembly according to claim 7, wherein:
the actuating assembly is a pedal assembly,
the mount is a pedal mount constructed to mount the pedal assembly in the vehicle in the operative position;
the arm is a pedal arm; and
the input portion is a pedal pad for engagement by the user's foot.

9. An actuating assembly according to claim 8, wherein the pedal assembly is a brake pedal assembly for operating a brake booster input element on the vehicle, and wherein the input connector is constructed to be connected to the brake booster input element when the pedal assembly is in the operative position.

10. An actuating assembly according to claim 9, wherein the cam guide structure is separate from the mount and is constructed to be mounted in the vehicle separately from the mount.

11. An actuating assembly according to claim 10, wherein the contoured cam surface has an increasing ratio section and a decreasing ratio section, the configuration of the cam surface being such that, when the pedal assembly is mounted in the operative position and the input connector is connected to the input element of the vehicle, (a) the second guide element engages the increasing ratio section of the contoured cam surface so as to pivot the link member and move the input connector so that the ratio increases as the arm is moved in the applying direction from the initial position and reaches the maximum peak, and (b) then engages the decreasing ratio section of the contoured cam surface so as to pivot the link member and move the input connector so that the ratio decreases as the pedal arm moves to the fully stroked position.

12. An actuating assembly according to claim 11, wherein a variance of the ratio as the pedal arm is moved in the applying direction is such that the ratio increases as the pedal arm is moved from the initial position and reaches the maximum peak prior to moving 30% of a distance to the fully stroked position.

13. An actuating assembly according to claim 12, wherein the variance of the ratio as the pedal arm is moved in the applying direction is such that the ratio reaches the maximum peak prior to moving 25% of the distance to the fully depressed position.

14. An actuating assembly according to claim 7, wherein the input connector is coaxial with the first guide element.

15. An actuating assembly according to claim 11, wherein the input connector is coaxial with the first guide element.

16. A method for converting a pedal assembly to a variable ratio configuration, the method comprising:
provclamd a pedal assembly comprising:
(i) a pedal mount constructed to mount the pedal assembly in a vehicle in an operative position;
(ii) a pedal arm pivotally connected to the pedal mount for movement in an applying direction from an initial position to a fully depressed position, and in a releasing direction from the fully depressed position to the initial position; and
(iii) a pedal pad provided in a distal end portion of the pedal arm for engagement by a user's foot to allow the user to push the pedal arm in the applying direction;
forming a guide slot in the pedal arm;
pivotally connecting a link member to the pedal arm, the link member having a first guide element spaced apart from the pivotal connection of the link member and a second guide element spaced apart from the first guide element and the pivotal connection of the link member;
slidably receiving the first guide element in the guide slot;
providing a cam guide structure having a contoured cam surface,
slidably engaging the second guide element on the link member with the cam surface of the cam guide structure;
mounting the pedal mount in the vehicle to mount the pedal arm assembly in the operative position; and
mounting the cam guide structure in the vehicle;
connecting an input connector provided on the link member to a brake booster input element on the vehicle;
wherein a configuration of the contoured cam surface, a configuration of the guide slot, and a configuration of the link member is such that, when the pedal arm is mounted in the operative position and the input connector is connected to the input element of the vehicle, the second guide element engages the contoured cam surface so as to pivot the link member and move the input connector so that a pedal ratio of A/B varies as the pedal arm is moved in the applying direction from the initial position to the fully depressed position, wherein A is a distance from the pivotal mounting of the pedal arm to the pedal pad and B is a distance from the pivotal mounting of the pedal arm to the input connector.

17. A brake pedal actuating assembly for installation in a vehicle to operate a brake booster input element on the vehicle, the actuating assembly comprising:
a pedal mount constructed to mount the actuating assembly in the vehicle in an operative position;
a pedal arm with a guide slot, the pedal arm being pivotally connected to the mount for movement in an applying direction from an initial position to a fully stroked position, and in a releasing direction from the fully stroked position to the initial position;
an input portion provided as a pedal pad on a distal end portion of the arm for engagement by a user's foot to allow the user to move the arm in the applying direction; and
an input connector constructed to be connected to the brake booster input element on the vehicle when the actuating assembly is installed in the operative position;
the input connector being operatively connected to the arm for movement relative to the arm such that, when the actuating assembly is mounted in the operative position and the input connector is connected to the input element of the vehicle, a ratio of $F_B/F_A$ varies as the arm is moved in the applying direction from the initial position to the fully stroked position, wherein $F_A$ is a force applied to the input portion and $F_B$ is a force applied to the vehicle's input element by the input connector;
a variance of the ratio as the arm is moved in the applying direction being such that (a) the ratio increases as the arm is moved from the initial position and reaches a maximum peak prior to moving 30% of a distance to the fully stroked position, and (b) then decreases as the arm moves to the fully stroked position;
a link member pivotally connected to the pedal arm, the link member having (a) a first guide element spaced apart from the pivotal connection of the link member and received in the guide slot of the pedal arm, and (b) a second guide element spaced apart from the first guide element and the pivotal connection of the link member, the input connector being provided on the link member;
a cam guide structure providing a contoured cam surface, the second guide element on the link member being engaged with the cam surface of the cam guide structure; and
a configuration of the contoured cam surface, a configuration of the guide slot, and a configuration of the link member being such that, when the pedal assembly is mounted in the operative position and the input connector is connected to the brake booster input element of the vehicle, the second guide element engages the contoured cam surface so as to pivot the link member and move the input connector to vary the ratio as the pedal arm is moved in the applying direction.

18. An actuating assembly according to claim 17, wherein the variance of the ratio as the pedal arm is moved in the applying direction is such that the ratio reaches the maximum peak prior to moving 25% of the distance to the fully stroked position.

19. An actuating assembly according to claim 17, wherein the cam guide structure is separate from the mount and is constructed to be mounted in the vehicle separately from the mount.

20. An actuating assembly according to claim 19, wherein the contoured cam surface has an increasing ratio section and a decreasing ratio section, the configuration of the cam surface being such that, when the pedal arm is mounted in the operative position and the input connector is connected to the brake booster input element of the vehicle, (a) the second guide element engages the increasing ratio section of the contoured cam surface so as to pivot the link member and move the input connector so that the ratio increases as the pedal arm is moved in the applying direction from the initial position and reaches the maximum peak, and (b) then engages the decreasing ratio section of the contoured cam surface so as to pivot the link member and move the input connector so that the ratio decreases as the pedal arm moves to the fully depressed position.

21. An actuating assembly according to claim 17, wherein the input connector is coaxial with the first guide element.

22. An actuating assembly according to claim 20, wherein the input connector is coaxial with the first guide element.

23. An actuating assembly for installation in a vehicle to operate an input element on the vehicle, the pedal assembly comprising:
   a mount constructed to mount the actuating assembly in the vehicle in an operative position;
   an arm pivotally connected to the mount for movement in an applying direction from an initial position to a fully stroked position, and in a releasing direction from the fully stroked position to the initial position, the arm having a guide slot;
   an input portion provided on a distal end portion of the arm for engagement by a user to allow the user to move the arm in the applying direction; and
   a link member pivotally connected to the arm, the link member having (a) a first guide element spaced apart from the pivotal connection of the link member and received in the guide slot of the arm, and (b) a second guide element spaced apart from the first guide element and the pivotal connection of the link member;
   an input connector constructed to be connected to the input element on the vehicle when the actuating assembly is installed in the operative position, the input connector being provided on the link member;
   a cam guide structure providing a contoured cam surface, the second guide element on the link member being engaged with the cam surface of the cam guide structure;
   a configuration of the contoured cam surface, a configuration of the guide slot, and a configuration of the link member being such that, when the actuating assembly is mounted in the operative position and the input connector is connected to the input element of the vehicle, the second guide element engages the contoured cam surface so as to pivot the link member and move the input connector so that a ratio of $F_B/F_A$ varies as the arm is moved in the applying direction from the initial position to the fully stroked position, wherein $F_A$ is a force applied to the input portion and $F_B$ is a force applied to the vehicle's input element by the input connector.

24. An actuating assembly according to claim 23, wherein:
   the actuating assembly is a pedal assembly,
   the mount is a pedal mount constructed to mount the pedal assembly in the vehicle in the operative position;
   the arm is a pedal arm; and
   the input portion is a pedal pad for engagement by the user's foot.

25. An actuating assembly according to claim 24, wherein the pedal assembly is a brake pedal assembly for operating a brake booster input element on the vehicle, and wherein the input connector is constructed to be connected to the brake booster input element when the pedal assembly is in the operative position.

26. An actuating assembly according to claim 25, wherein the cam guide structure is separate from the mount and is constructed to be mounted in the vehicle separately from the mount.

27. An actuating assembly according to claim 26, wherein the contoured cam surface has an increasing ratio section and a decreasing ratio section, the configuration of the cam surface being such that, when the pedal assembly is mounted in the operative position and the input connector is connected to the input element of the vehicle, (a) the second guide element engages the increasing ratio section of the contoured cam surface so as to pivot the link member and move the input connector so that the ratio increases as the arm is moved in the applying direction from the initial position and reaches the maximum peak, and (b) then engages the decreasing ratio section of the contoured cam surface so as to pivot the link member and move the input connector so that the ratio decreases as the pedal arm moves to the fully stroked position.

28. An actuating assembly according to claim 27, wherein a variance of the ratio as the pedal arm is moved in the applying direction is such that the ratio increases as the pedal arm is moved from the initial position and reaches the maximum peak prior to moving 30% of a distance to the fully stroked position.

29. An actuating assembly according to claim 28, wherein the variance of the ratio as the pedal arm is moved in the applying direction is such that the ratio reaches the maximum peak prior to moving 25% of the distance to the fully depressed position.

30. An actuating assembly according to claim 23, wherein the input connector is coaxial with the first guide element.

31. An actuating assembly according to claim 27, wherein the input connector is coaxial with the first guide element.

* * * * *

UNITED STATES PATENT AND TRADEMARK OFFICE
CERTIFICATE OF CORRECTION

| | | |
|---|---|---|
| PATENT NO. | : 7,219,576 B2 | Page 1 of 1 |
| APPLICATION NO. | : 10/995098 | |
| DATED | : May 22, 2007 | |
| INVENTOR(S) | : Leonard et al. | |

It is certified that error appears in the above-identified patent and that said Letters Patent is hereby corrected as shown below:

Col. 13, line 64
 replace "pedal"
 with --actuating--.

Col. 17, line 11
 replace "pedal"
 with --actuating--.

Signed and Sealed this

Eleventh Day of September, 2007

JON W. DUDAS
*Director of the United States Patent and Trademark Office*